United States Patent
Marchand et al.

(10) Patent No.: US 11,778,009 B2
(45) Date of Patent: Oct. 3, 2023

(54) METHOD FOR RENDERING A MULTIMEDIA CONTENT AND A NAVIGATION INTERFACE ON A SCREEN

(71) Applicant: ORANGE, Issy-les-Moulineaux (FR)

(72) Inventors: Herve Marchand, Chatillon (FR); Olivier Gaste, Chatillon (FR); Mathieu Rivoalen, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/125,010

(22) Filed: Dec. 17, 2020

(65) Prior Publication Data

US 2021/0194945 A1 Jun. 24, 2021

(30) Foreign Application Priority Data

Dec. 18, 2019 (FR) ...................................... 1914723

(51) Int. Cl.
*H04L 29/06* (2006.01)
*H04L 65/70* (2022.01)
*H04L 65/65* (2022.01)
*H04L 65/75* (2022.01)
*H04L 65/612* (2022.01)

(52) U.S. Cl.
CPC ............ *H04L 65/70* (2022.05); *H04L 65/612* (2022.05); *H04L 65/65* (2022.05); *H04L 65/75* (2022.05)

(58) Field of Classification Search
CPC . H04L 65/607; H04L 65/4084; H04L 65/601; H04L 65/608
See application file for complete search history.

(56) References Cited

U.S. PATENT DOCUMENTS

| 9,582,157 B1* | 2/2017 | Chatterjee | G06F 16/738 |
| 10,445,585 B1* | 10/2019 | Ludden | G06V 20/41 |
| 2005/0071782 A1* | 3/2005 | Barrett | H04N 5/45 348/E7.071 |

(Continued)

FOREIGN PATENT DOCUMENTS

| EP | 2224728 A1 | 9/2010 |
| FR | 3019429 A1 | 10/2015 |

OTHER PUBLICATIONS

French Search Report dated Jul. 3, 2020 for corresponding French Application No. 1914723, filed Dec. 18, 2019.

(Continued)

*Primary Examiner* — Nazia Naoreen
(74) *Attorney, Agent, or Firm* — David D. Brush; Westman, Champlin & Koehler, P.A.

(57) ABSTRACT

A method for managing, in a reader terminal, streaming of a televisual content, called the main content, and of a navigation interface concomitantly from a telecommunication network, the navigation interface has regions including contents representative of real-time televisual contents available for selection, which contents are called secondary contents. The method includes the following steps, in the multimedia-stream reader terminal: receiving a command to display the navigation interface; and transmitting a request to access secondary contents of the interface, the request including a datum representative of a type of secondary contents to be streamed, the chosen image type taking into account a datum related to the streaming of the main content.

8 Claims, 2 Drawing Sheets

(56) References Cited

U.S. PATENT DOCUMENTS

2006/0037045 A1* 2/2006 Hsieh ................ H04N 21/47
  725/100
2019/0149885 A1* 5/2019 Madison ............ H04N 21/4312
  715/838
2020/0233543 A1* 7/2020 Lee .................. H04N 21/47202

OTHER PUBLICATIONS

English translation of the French Written Opinion dated Jul. 3, 2020 for corresponding French Application No. 1914723, filed Dec. 18, 2019.

* cited by examiner

[Fig 1]
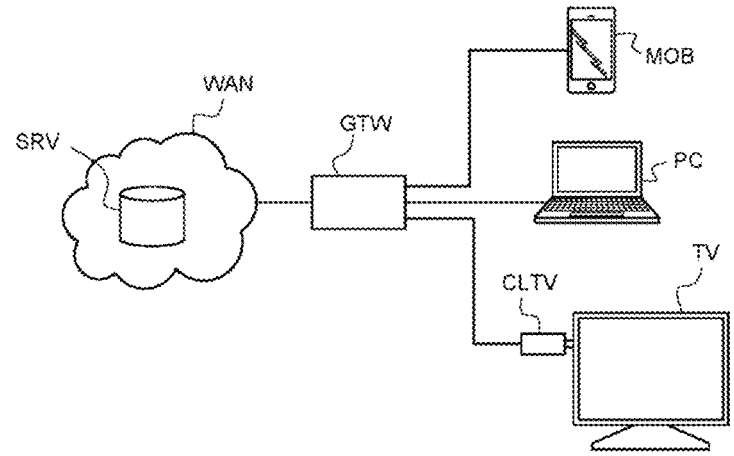
[Fig 2]
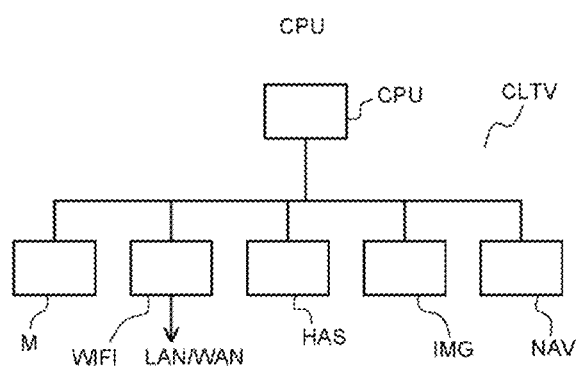
[Fig 3]
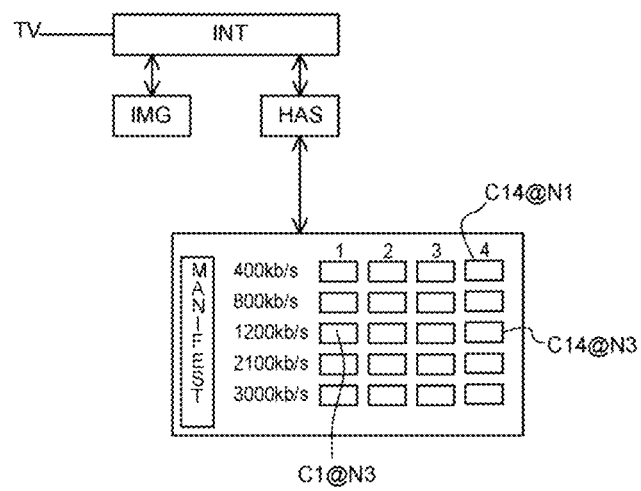

[Fig 4]
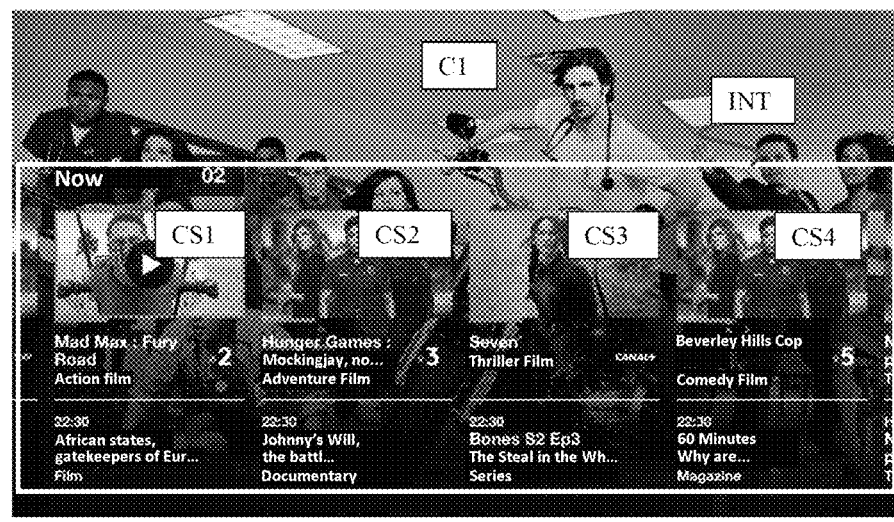
[Fig 5]
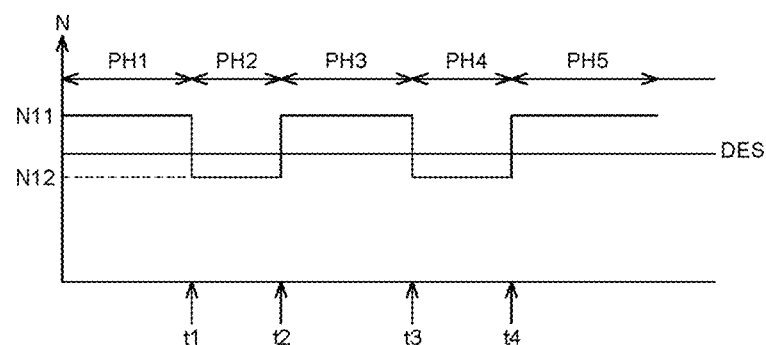
[Fig 6]
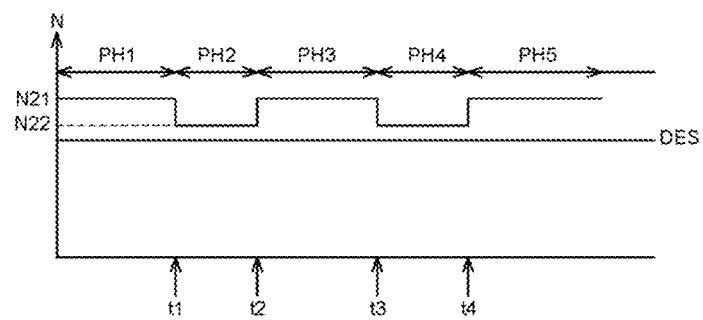

METHOD FOR RENDERING A MULTIMEDIA CONTENT AND A NAVIGATION INTERFACE ON A SCREEN

TECHNICAL FIELD

The field of the invention is that of the transmission of digital multimedia contents, namely digital audio and/or video contents. More precisely, the invention relates to the rendition of a content of the navigation-interface type concomitantly with the rendition of a content streamed via a telecommunication network. The invention most particularly relates to content streamed using a HAS (HTTP Adaptive Streaming) technique or any other streaming technique using the same principle.

The invention applies to any device capable of rendering both HAS video contents and a navigation interface. These devices are for example a TV dongle, a Web TV, a connected television, a digital television decoder, etc.

PRIOR ART

Access to a multimedia content, such as television or video on demand, over the Internet is currently possible for most rendering terminals, especially when they belong to a local communication network, such as a home network.

The terminal generally sends a request to a server, thereby indicating the chosen content, referred to as the main content below; the terminal receives in return a stream of digital data relating to this content. In the context of a local communication network, such a request transits via the access gateway of the network, the residential gateway for example.

The terminal is able to receive these digital contents in the form of multimedia data and to carry out a rendition thereof. This rendition consists in delivering, via the terminal, the digital content in a form that is accessible to the user. For example, received data corresponding to a video are generally decoded, then rendered via the terminal in the form of a display of the corresponding video with its associated soundtrack. Below, for the sake of simplification, the digital content will be considered to be a video and the rendition by the terminal, or consumption by the user of the terminal, will be considered to be viewing of this video on the screen of the terminal.

The transmission of digital contents over the Internet is often based on client-server protocols of the HTTP family (HTTP being the acronym of HyperText Transport Protocol). In particular, streaming of digital contents allows the data to be transported and consumed in real-time, i.e. the digital data are transmitted over the network and rendered by the terminal as they arrive. The terminal receives and stores some of the digital data in a buffer memory before rendering them. This distribution mode is particularly useful when the bandwidth currently available to the user is not guaranteed to remain so for the real-time transfer of the video.

HTTP adaptive streaming (abbreviated HAS) in addition allows data to be transmitted and received with various qualities for example corresponding to various bit rates. These various qualities are described in a manifest available to download from a data server, a content server for example. When the client terminal desires to access a content, this manifest allows the correct format for the content to be consumed to be selected depending on the available bandwidth or on the storage and decoding capacities of the client terminal. This type of technique especially allows variations in the bandwidth of the link between the client terminal and the content server to be taken into account.

A number of technical solutions allowing streaming of such a content to be facilitated already exist, such as for example the proprietary solutions Microsoft® Smooth Streaming, Apple® HLS, Adobe® HTTP Dynamic Streaming or even the MPEG-DASH standard of the organization ISO/IEC, which will be described below. These methods propose to address, to the client, one or more manifests containing the addresses of the various segments with the various qualities of the multimedia content.

Thus, the MPEG-DASH standard (DASH standing for "Dynamic Adaptive Streaming over HTTP") is a standard format for audiovisual transmission over the Internet. It is based on preparation of the content into various versions of variable bit rate and quality, said versions being divided into segments of short duration (of about a few seconds), which are also called chunks. Each of these segments is made available individually by means of an exchange protocol. The protocol mainly targeted is the HTTP protocol, but other protocols (FTP for example) may also be used. The organization of the segments and the associated parameters are published in a manifest in XML format.

The principle underlying this standard is that the MPEG-DASH client terminal estimates the bandwidth available to receive segments, and, depending on how full its reception buffer is, chooses, for the next segment to be streamed, a version the bit rate of which ensures the best possible quality, and allows a reception delay compatible with an uninterrupted rendition of the content.

Thus, to adapt to variation in network conditions, especially in terms of bandwidth, existing adaptive-streaming solutions allow the client terminal to pass from a version of the content encoded with a certain encoding bit rate, to another encoded at another bit rate, during the streaming. Specifically, each version of the content is divided into segments of same duration. To allow a continuous rendition of the content on the terminal, each segment must reach the terminal before its scheduled rendering time. The perceived quality associated with a segment increases with the size of the segment, expressed in bits, but at the same time, larger segments require a longer transmission time, and therefore have a higher risk of not being received in time for the content to be rendered without interruption.

The rendering terminal must therefore find a compromise between the overall quality of the content and the need to render it without interruption, by selecting the next segment to be streamed with care, from the various proposed encoding bit rates. Algorithms for selecting the quality of the content depending on the available bandwidth, and which may employ strategies of greater or lesser aggressiveness or greater or lesser security, exist to this end.

The consumption of digital contents via HTTP adaptive streaming (HAS) is tending to become more common. HAS is especially used by many streaming services, but also by certain TV decoders, or set-top boxes, which use it to access delinearized contents such as video on demand (VOD), to replay television programs, or even to provide services such as Network PVR (Network Personal Video Recorder, i.e. a service for recording digital contents, the recording being made by the content provider itself rather than in the home of the end-user).

Furthermore, other devices, such as real-time multimedia-stream reader apparatuses, generally access digital contents such as real-time (or live) televisual contents in an adaptive-streaming mode. This is for example the case of the apparatus CléTV® supplied by Orange®.

Such an apparatus is conventionally plugged into the HDMI port of a television set and communicates, via a Wi-Fi® connection, with another apparatus of the home communication network (residential gateway, computer, smart phone, tablet, etc.) that is connected to a wide-area communication network such as the Internet, with a view to rendering, on the television set, the multimedia content received by a compatible software application. Below, such apparatuses will be referred to as HDMI keys.

The quality of the video delivered to the client terminal will therefore continuously adapt to constraints on its access bandwidth, creating competition with all the other services that consume bandwidth and in particular navigation interfaces. A navigation interface showcases selectable contents, and allows various live television channels to be accessed via a list of contents that is called a VZL (Virtual Zapping List). The navigation interface in question may be displayed concomitantly with a multimedia content, called the main content, being broadcast and streamed in HAS mode.

The contents available for selection from the VZL are often associated with a multimedia content, called the secondary content. A secondary content is often an image but may very well be a video. The display of the interface requires images representative of televisual contents available for selection to be retrieved from servers. In addition, these images are regularly retrieved because they change depending on the live televisual contents that are being broadcast. To provide an optimal quality of service, these images must have a sufficiently high quality, so as to make the interface displayed on the screen pleasant for a user to look at. However, to stream these images and to update them as required consumes a lot of bandwidth and sometimes requires the client terminal to decrease the bit rate of the segments requested for the main content being rendered. A decrease in the quality with which the main content is rendered results from the various concomitant downloads.

SUMMARY

An exemplary embodiment of invention aims to improve the situation.

An exemplary embodiment of the invention relates to a method for managing, in a reader terminal, streaming of a televisual content, called the main content, and of a navigation interface concomitantly from a telecommunication network, the navigation interface comprising regions including contents representative of real-time televisual contents available for selection, which contents are called secondary contents, characterized in that it comprises the following steps, in the multimedia-stream reader terminal:
 a step of receiving a command to display the navigation interface,
 a step of transmitting a request to access secondary contents of the interface, the request including a datum representative of a type of secondary contents to be streamed, the chosen type taking into account a datum related to the streaming of the main content.

According to an exemplary embodiment of the invention, simultaneous access to two types of contents, namely a televised content and a navigation interface that contains contents, is managed by judiciously making the encoding bit rates of the two types of content vary depending on the quality desired for each of the contents or even for the set including the main content and the navigation interface. It may for example be desired to prioritize the televised content over the navigation interface or vice versa.

To achieve this objective, the function of the image-streaming module is to require requests to access the secondary contents to specify a particular value representative of an image quality, this value being chosen so as to ensure the navigation interface and/or the televised stream is rendered with the desired quality.

It will be seen below that the desired quality is dependent on the particular case; the quality with which the streamed content is rendered may be given priority over that of the images rendered in the navigation interface; or vice versa. If the quality desired for the rendition of the streamed content is an optimal quality, decreasing the quality of the images allows the bandwidth allocated to the main content being streamed to be increased and therefore the quality with which the main content is rendered to be improved.

According to a first particular embodiment of the invention, the main content is streamed in the form of chunks having time-variable encoding bit rates. In this configuration, the datum related to the streaming of the main content is a value of the encoding bit rate used for the streaming. This first embodiment uses an encoding-bit-rate value available to the rendering terminal and therefore has the advantage of not requiring any particular computation.

According to yet a second particular embodiment of the invention, which will possibly be employed as an alternative or in addition to the preceding embodiment, the datum furthermore comprises an encoding-bit-rate threshold value not to be crossed when streaming the main content. This embodiment ensures the main content is rendered with a quality at least equal to the predefined encoding-bit-rate threshold.

According to yet a third particular embodiment of the invention, which will possibly be implemented alternatively or in addition to the preceding ones, the datum related to the streaming of the main content is a value representative of the type of communication network used to stream the main content. In this third mode, the type of image will depend on the transmission medium of the network; for example, whether the network is a fiber network, an ADSL network, etc.

It will be seen that the streaming of the main content and of the secondary contents are managed by respective streaming modules. According yet a fourth particular embodiment of the invention, which will possibly be implemented alternatively or in addition to the previous ones, the type of image to be used corresponds to an encoding bit rate. This fourth embodiment applies to streaming of images using HAS. The streaming modules may therefore be combined; in other words, the streaming modules are one module.

According to yet a fifth particular embodiment of the invention, which will possibly be implemented alternatively or in addition to the preceding ones, the datum related to the streaming of the main content is an encoding bit rate of a value chosen in such a way that the sum of the encoding bit rate requested for the secondary contents and the current encoding bit rate used for the main content is lower than a given maximum encoding-bit-rate value. This fifth embodiment ensures that the service encompassing the rendition of a main content and the rendition of a navigation interface does not exceed a given encoding bit rate in order to offer an acceptable bandwidth to the other services being executed by the reader terminal or capable of being executed.

According to a hardware aspect, an exemplary embodiment of the invention relates to an entity for managing, in a reader terminal, streaming of a televisual content, called the main content, and of a navigation interface concomitantly from a telecommunication network, the navigation interface comprising regions including contents representative of real-time televisual contents available for selection, which contents are called secondary contents, the televisual content being streamed in the form of chunks having time-variable encoding bit rates, characterized in that it comprises:

a module for receiving a command to display the navigation interface, a module for transmitting a request to access secondary contents of the interface, the request including a datum representative of a type of image to be used for the transmission of the secondary contents, the chosen type taking into account a datum related to the streaming of the main content.

According to another hardware aspect, an exemplary embodiment of the invention relates to a reader terminal comprising a managing entity such as defined above.

According to another hardware aspect, the subject of an exemplary embodiment of the invention is a computer program able to be implemented on a managing entity such as defined above, the program comprising code instructions that, when it is executed by a processor, performs the steps of the method that are defined above.

According to another hardware aspect, the subject of an exemplary embodiment of the invention is a data medium on which has been stored at least one sequence of program-code instructions for executing a managing method such as defined above.

The medium in question may be any entity or device capable of storing the program. For example, the medium may comprise a storage means, such as a ROM, a CD-ROM or a microelectronic-circuit ROM for example, or else a magnetic storage means, a hard disk for example. Moreover, the data medium may be a transmissible medium such as an electrical or optical signal, which may be routed via an electrical or optical cable, by radio or by other means. The program according to an exemplary embodiment of the invention may in particular be downloaded from an Internet-type network. Alternatively, the data medium may be an integrated circuit into which the program is incorporated, the circuit being suitable for executing or for being used in the execution of the method in question.

BRIEF DESCRIPTION OF THE DRAWINGS

One or more embodiment of the invention will be better understood on reading the following description, which is given by way of example and with reference to the appended drawings, in which:

FIG. 1 shows an architecture for streaming over the Internet based on the use of HAS according to an exemplary embodiment of the invention;

FIG. 2 schematically illustrates the hardware structure of a real-time multimedia-stream reader incorporating a device for managing HAS according to one embodiment of the invention;

FIG. 3 shows the main elements of the system and a schematic view of the various segments of a main content;

FIG. 4 shows an example of rendition of a televised content concomitantly with a navigation interface;

FIG. 5 shows the variation in the encoding bit rate used for the main content according to the prior art;

FIG. 6 shows the variation in the encoding bit rate used for the main content according to one embodiment of the method of the invention.

DETAILED DESCRIPTION OF EMBODIMENTS OF THE INVENTION

With reference to FIG. 1, a streaming architecture based on the use of HAS according to one embodiment of the invention will now be described. It will be noted here, as it was noted above, that the invention is not limited to the HAS technology but extends to any other technology for streaming data.

The terminal MOB, which is for example a smart phone, the terminal PC, which is for example a laptop computer, and the terminal CLTV, which is for example an HDMI key connected to a television set TV, are in this example located in a local area network LAN controlled by a residential gateway GTW. The context of the local network is given by way of example and could easily be transposed to a best-effort Internet network, to a corporate network, etc.

A digital-content server SRV is located, in this example, in the wide area network WAN but it could equally well be located in the local area network LAN, for example in the residential gateway GTW or any other equipment capable of hosting such a content server. The content server SRV for example receives channels of digital-television content from a television broadcaster (not shown) and/or videos on demand, and makes them available to the client terminals.

The client terminals MOB, PC, CLTV may communicate with the content server SRV with a view to receiving one or more contents (films, documentaries, advertisements, etc.).

In this client-server context, to exchange data between the client terminals MOB, PC, CLTV and the server SRV, an adaptive streaming technique based on the HTTP protocol (HAS) is frequently used. This type of technique especially allows the user to be offered a good content quality while taking into account variations in bandwidth that may occur on the link between the client terminal MOB, PC, CLTV and the service gateway GTW, and/or between the latter and the content server SRV.

Conventionally, as will be described with reference to FIG. 3, a given content of a channel may be encoded with various qualities, for example corresponding to various bit rates. More generally, the term "quality" will be used to refer to a certain resolution of the digital content (spatial resolution, temporal resolution, quality level associated with the video and/audio compression) with a certain encoding bit rate. Each quality level is itself divided, in the content server, into temporal segments (or "chunks", these two words being used interchangeably throughout this document).

The description of these various qualities and of the associated temporal segmentation, and the chunks, are described for the client terminal and made available thereto via their Internet addresses (URI: Universal Resource Identifier). All of these parameters (qualities, addresses of the chunks, etc.) are in general grouped together in a parameter file called the manifest. It will be noted that this manifest may be a computer file or a set of pieces of information describing the content, accessible at a certain address.

The terminals MOB, PC and CLTV possess their own characteristics in terms of decoding capacity, display capacity, etc. In a HAS context, they may adapt their requests to receive and decode the content requested by the user to the quality that best corresponds thereto. In our example, if the contents are available at bit rates of 512 kb/s (kilobits per second) (resolution 1, or level 1, denoted N1), 1024 kb/s (N2) and 2048 kb/s (N3) and the client terminal has available a bandwidth of 3000 kb/s, it may request the content at any bit rate lower than this limit, 2048 kb/s for example.

Generally, content number i with quality j is denoted "Ci@Nj" (for example the j-th quality level Nj described in the manifest).

The service gateway GTW is, in this example, a residential gateway that routes the data between the wide area network WAN and the local area network LAN and manages the digital contents; to do this, it especially receives them from the network and decodes them by virtue of decoders that are here assumed to be integrated into the gateway GTW or into the client terminals MOB, PC or CLTV. As a variant, the decoders may be located elsewhere in the wide area network WAN or local area network LAN, and especially in an STB (acronym of set-top box) (not shown) associated with a television set.

In this example, to display a content, the terminal MOB, PC or CLTV firstly interrogates the service gateway GTW with a view to obtaining an address of the manifest MNF of the desired content (for example, C1). The service gateway GTW responds by delivering, to the terminal, the address of the manifest MNF. Below, this file will be assumed to be a manifest according to the MPEG-DASH standard (which file is denoted "C.mpd").

Alternatively, this file may be retrieved directly from a local Internet server or an Internet server external to the local network, or already be found in the service Gateway or in the terminal at the moment of the request.

An example of a manifest (MPD) according to the MPEG-DASH standard and containing the description of contents available in three different qualities (N1=512 kb/s, N2=1024 kb/s, N3=2048 kb/s) of the segmented contents is presented in Appendix 1. This simplified manifest describes the digital contents in an XML syntax (XML being the acronym of eXtended Markup Language) and comprises a list of content chunks conventionally described between a start marker (<SegmentList>) and an end marker (</SegmentList>). The division into chunks especially allows fluctuations in bandwidth to be adapted to, finely. Each chunk corresponds to a certain duration (field "duration") with a plurality of quality levels and allows their addresses (URL—Uniform Resource Locator) to be generated. This generation is done in this example using "BaseURL" elements ("HTTP://servercom") that indicate the address of the content server and "SegmentURL" elements that list the complementary portions of the addresses of the various chunks:

"C1_512kb_1.mp4" for the first chunk of the content "C1" at 512 kilobits per second ("kb") in the format MPEG-4 ("mp4"), "C1_512kb_2.mp4" for the second chunk, etc.

Once it has the addresses of the chunks corresponding to the desired content, the service gateway GTW obtains the chunks by download from these addresses. It will be noted that this download is here achieved, conventionally, via an HTTP URL, but could also be achieved via a universal resource indicator (URI) describing another protocol (dvb://mysegmentofcontent for example).

A single client terminal, for example the key CLTV that is connected to the television set TV by being plugged into the HDMI port of the latter, will now be considered. The principle of an exemplary embodiment of the invention could of course be implemented on the terminals PC or MOB.

The key CLTV is used to render, on the screen of the television set TV, a television program. Below, this television program is referred to as the content C1. Such a content C1 is described in a manifest MNF.

As a variant, it will be noted that the content C1 may be a delayed-broadcast television program, or a video on demand, or a personal video of the user, or any other multimedia content of set duration, to which one or more embodiments of the invention also applies.

The key CLTV may be controlled by the user by means of the smart phone MOB, on which is installed a software application for remotely controlling the key CLTV.

The content chunks obtained via the residential gateway GTW are for example transmitted by WiFi® to the key CLTV, which controls their display on the screen of the television set TV, with a view to rendering them to the user.

FIG. 2 shows an architecture of a key CLTV according to one embodiment of the invention.

The key CLTV comprises, as is conventional, memories M associated with a processor CPU. The memories may be ROMs (ROM being the acronym of Read Only Memory) or RAMs (RAM being the acronym of Random Access Memory) or indeed flash memories. The key CLTV communicates with the local area network LAN and the wide area network WAN via the Wi-Fi module to achieve local wireless communication with the residential gateway GTW or another communication terminal of the local area network LAN, the smart phone 3 for example. The key CLTV furthermore comprises a streaming module HAS suitable for requesting one of the contents to be streamed at one of the qualities proposed in a manifest MNF. This manifest MNF may for example be stored in the memories M of the key CLTV or be stored elsewhere.

The key CLTV is connected to a television set TV, via an HDMI link.

The key CLTV furthermore comprises a module IMG for streaming secondary contents, which module is described below, and a streaming module HAS for managing the streaming of contents in HAS mode.

The key CLTV may also contain other modules such as a hard disk (not shown) for storing video chunks, a module for controlling access to the contents, and a module for processing commands received from the smart phone.

Now, with reference to FIG. 3, the main elements of a key CLTV and a schematic view of a main content C1 stored in the content server SRV in the form of segments will now be described. More precisely, the content server HAS contains a video C1 that is divided into chunks C1i@Nj that are encoded at various encoding bit rates N, where the index i is a temporal identifier of the chunk C1i@Nj.

In the prior art, the streaming module HAS of the key CLTV is responsible for retrieving these chunks from the content server HAS and chooses the video quality Nj depending on the available network resource. The way in which the streaming module HAS chooses the encoding bit rate of the next video chunk to be streamed will not be described in detail here: specifically, there are many algorithms allowing this choice to be made, the security and aggressiveness of the strategies of which vary. It will however be recalled that, most often, the general principle of such algorithms is based on the download of a first chunk at the lowest encoding bit rate proposed in the manifest, and on the evaluation of the time taken to retrieve this first chunk. On this basis, the streaming module HAS evaluates whether, depending on the size of the chunk and on the time taken to retrieve it, the network conditions allow the following chunk to be streamed at a higher encoding bit rate. Certain algorithms are based on a gradual increase in the quality level of the streamed content chunks; others propose more risky approaches, with jumps in the levels of the encoding bit rates of successive chunks.

In the conventional case, if a video chunk last 3 seconds, the retrieval of the chunk by the streaming module HAS must not take more than 3 seconds, in order to allow the content to be rendered by the key CLTV without interruption. It is therefore necessary for the streaming module HAS to find the best compromise between the rendition quality, and therefore encoding bit rate, which must be as high as possible, and the time taken to stream the chunk, which must be low enough to allow a continuous rendition on the television set TV.

In the embodiment illustrated in FIG. 3, the streaming module HAS commands the download of a chunk at the optimal encoding bit rate as described in detail below.

Initially, the module HAS retrieves the manifest MNF that corresponds to the video content C1 in order to discover the available chunks of the video content C1, and the various associated video qualities Nj. In the example of FIG. 3, the content C1 is for example available in the form of chunks of 3 s duration, with a first encoding bit rate N1=500 kb/s, a second encoding bit rate N2=2000 kb/s, a third encoding bit rate N3=2000 kb/s, etc.

In a normal operating mode (not illustrated in FIG. 3), the module HAS for example streams the successive chunks C11@N1 (i.e. the first temporal chunk at an encoding bit rate of 500 kb/s), then C12@N3 (i.e. the second temporal chunk at an encoding bit rate of 2000 kb/s), then C13@N3 (i.e. the third temporal chunk at an encoding bit rate of 2000 kb/s), etc.

The various chunks streamed by the streaming module HAS are transmitted to an interface module INT with a view to rendition thereof to the user on the screen of the television set TV. The module INT manages the interface with the television set TV, via which it for example obtains information on any interactions of the user with the television set TV (action on the remote control of the television set, for example a press on the volume button or a button for changing channel), and via which it may control the display on the screen of the television set TV of a requested content, for example a television channel and a navigation interface concomitantly.

The algorithm employed by the streaming module HAS to determine which chunk at which encoding bit rate must be streamed in normal operating mode may be one of the algorithms already known in the prior art. This algorithm will therefore not be described in more detail here.

As indicated above, a navigation interface is accessible and may be rendered at the same time as the video content C1 on the screen. The navigation interface INT comprises secondary contents that are able to be streamed with a view to respective renditions thereof on the screen.

Contents other than the video content C1, i.e. the main content, and the secondary contents may be streamed concomitantly. However, to simplify the description of an exemplary embodiment of the invention, it will be assumed that the only services being used are streaming of the main content, by the streaming module HAS, and streaming of the secondary contents, in our example images, by the image-streaming module IMG.

In our exemplary embodiment, the main content C1 is a televised content.

FIG. 4 illustrates a screen ECR concomitantly displaying a main content C1 and a navigation interface NAV.

The interface NAV comprises, in our example, four regions associated with four secondary contents CS1-CS4 that are available for selection, respectively. In other words, a user may zap the main content C1 to a secondary content by selecting one of the secondary contents, for example using a remote control.

A secondary content may irrespectively be an image, a succession of images, or a video extract from the content.

In our example, the secondary contents CS1-CS4 are images representative of contents able to be selected and to be rendered by way of main content. Most the time, the image is related to the proposed content. If a television channel is broadcasting a cartoon, the associated image in the navigation interface is for example an image of a scene of the cartoon.

In FIG. 4, the displayed content includes a televised content C1 in the background and the navigation interface INT in the foreground. The interface INT comprises a drop-down menu (not shown) allowing television channels other than those that are displayed to be accessed. Images CS1-CS4 are associated with the television channels accessible from the interface.

FIG. 5 illustrates the variation in the encoding bit rate selected by the streaming module HAS as a function of time according to the prior art.

In a first phase PH1, the streaming module HAS selects, for the main content C1, a first bit rate N1 and receives segments with this encoding bit rate N1.

In a second phase, which starts at a time t1, a user requires the navigation interface INT to be displayed.

Following the request to access the interface INT, a request to access the images CS1-CS4 is transmitted to the server SRV via the network. Because of the decrease in bandwidth related to the reception of the images of the interface, the streaming module HAS decreases the encoding bit rate to use for the segments to come from the value N11 to the value N12. The obtained bit rate value N12 is maintained throughout a second phase PH2, which corresponds to the length of time taken to stream the images, namely the length of time between the times t1 and t2.

Once the images of the interface have been streamed, the bandwidth increases and the client HAS re-adapts the encoding bit rate to the segments to be streamed. The module HAS once again selects the bit rate N12 and maintains it throughout a third phase PH3 that ends at the time t3, which corresponds to a time at which all or some of the images are updated. In our example, these updates occur periodically.

As with the second phase PH2, a fourth phase PH4 occurs after the third phase PH3, in which phase, because of the decrease in the bandwidth related to reception of the updates of the images of the interface, the streaming module HAS makes a decrease of X kb/s. The obtained bit rate value N12 is maintained throughout this fourth phase PH4, which corresponds to the length of time taken to stream the updates of the images, namely the length of time between the times t3 and t4.

Nevertheless, a problem arises when a given image quality is desired for the rendition of the main content C1. In this case, the module HAS preferably must not select an encoding bit rate lower than a threshold encoding bit rate DES. To solve this problem, according to an exemplary embodiment of the invention, the request to access the navigation interface comprises a datum representative of a type of image to be streamed, the chosen image type taking into account a datum related to the streaming of the main content. The datum related to the streaming of the main content is for example a value of the encoding bit rate used for the streaming. The data may also be complemented by a threshold encoding-bit-rate value DEs not to be crossed when streaming the main content C1, to ensure a given image quality. For example, the threshold encoding bit rate DEs may be set to 1024 kb/s. In this configuration, the streaming module IMG may require a given image quality chosen from a plurality of image qualities to respect the threshold encoding bit rate set by the streaming client HAS. This embodiment of the invention is described with reference to FIG. 6.

FIG. 6 contains the same phases as those described with reference to FIG. 5, the only difference being that the image quality requested by the image-streaming module IMG varies over time. In our example, the images requested by the streaming module IMG have a quality lower than the preceding example and thus occupy less bandwidth, to the advantage of the televised content C1 which therefore sees a larger bandwidth and may therefore require an encoding bit rate N22 higher than N21 and above all higher than the threshold bit rate DEs. In other words, the bit rate N22 requested by the streaming client HAS has a bit rate intermediate between the bit rate N11 and the bit rate DEs.

It will be noted here that the invention is obviously not limited to two image qualities but extends to a higher number of image qualities.

According to one variant, the datum related to the streaming of the main content is an encoding bit rate of a value chosen in such a way that the sum of the encoding bit rate requested for the secondary contents and the current encoding bit rate used for the main content is lower than a given maximum encoding-bit-rate value. This variant is advantageous when the rendition of a main content and the navigation interface forms parts of a given service and it is desired not to exceed a given bandwidth and therefore to be able to provide a comfortable amount of headroom with respect to access bit-rate to the other services able to be executed at the same time on the key CLTV.

To illustrate the example described with reference to FIG. 6, let for example the current bandwidth of access to the network RES be about 8 Mb/s and the current encoding bit rate C1i@Nj of the received chunks to be 5 Mb/s. The image-streaming module IMG therefore in theory has a remaining bandwidth of 3 Mb/s available to it.

Let it also be assumed that the threshold encoding bit rate DEs is set to 4 Mb/s, the image-streaming client IMG will therefore set the image quality to 2 Mb/s or less and thus allocate 3 Mb/s as remaining bandwidth to the streaming module HAS of the televised content.

Assuming that the two available image qualities are associated with bits rates of 2 Mb/s and 4 Mb/s, the streaming client will select the bit rate of 2 Mb/s.

As a variant, the data representative of a type of image to be streamed may also be defined by virtue of parameters such as height, width, compression ratio, etc., the content servers SRV being tasked with delivering the requested content with the delivered parameters.

According to a last variant, the datum related to the streaming of the main content is a value representative of the type of communication network used to stream the main content. For example, if the network used to stream the televised content is a network that has a high performance in terms of bandwidth, a fiber network for example, the quality chosen for the images will preferably be a good quality. In contrast, if the network is of lower performance, such as for example an ADSL network, the chosen quality will be lower.

The invention claimed is:

1. A method comprising:
  managing, in a multimedia-stream reader terminal, streaming of a televisual content, called a main content, and of a navigation interface concomitantly from a telecommunication network, the navigation interface comprising regions including contents representative of real-time televisual contents available for selection, which are called secondary contents, the main content being streamed in the form of chunks having a plurality of time-variable encoding bit rates including a lower bit rate and a higher bit rate, an encoding bit rate for the main content being selected as a function of an available bandwidth of the telecommunication network, wherein a secondary content of the secondary contents available for selection has a plurality of image qualities and wherein the managing comprises, in the multimedia-stream reader terminal:
  prior to receiving a command to display the navigation interface, defining an encoding-bit-rate threshold value, which is higher than the lower bit rate and is not to be crossed when streaming the main content and the navigation interface concomitantly, the encoding-bit-rate threshold value being chosen among the plurality of time variable encoding bit rates independently of the available bandwidth of the telecommunication network;
  receiving the command to display the navigation interface;
  defining an image quality chosen among said plurality of image qualities, said image quality being chosen such that the encoding bit rate-used for streaming the main content remains higher than said defined threshold value;
  transmitting a request to access the secondary content of the interface, the request including a datum representative of the defined image quality; and
  receiving both main content with a bit rate higher than said threshold value and the secondary content with the defined image quality.

2. The method according to claim 1, wherein the datum related to the streaming of the main content further comprises the encoding bit rate used for the streaming.

3. The method according to claim 2, wherein the datum related to the streaming of the main content comprises the encoding bit rate of a value chosen in such a way that the sum of an encoding bit rate requested for the secondary content and the encoding bit rate used for the main content is lower than a given maximum encoding-bit-rate value.

4. The method according to claim 1, wherein the datum related to the streaming of the main content comprises a value representative of a type of communication network used to stream the main content.

5. The method according to claim 1, wherein a type of the requested secondary content corresponds to the encoding bit rate.

6. An entity for managing, in a reader terminal, streaming of a televisual content, called a main content, and of a navigation interface concomitantly from a telecommunication network, the navigation interface comprising regions including contents representative of real-time televisual contents available for selection, which contents are called secondary contents, the main content being streamed in the form of chunks having a plurality of time-variable encoding bit rates including a lower bit rate and a higher bit rate, an encoding bit rate for the main content being selected as a function of an available bandwidth of the telecommunication network, wherein a secondary content of the secondary contents available for selection has a plurality of image qualities, and wherein the entity comprises:
  processor; and a non-transitory computer-readable medium comprising instructions stored thereon which when executed by the processor configure the entity to:
prior to receiving a command to display the navigation interface, define an encoding-bit-rate threshold value, which is higher than the lower bit rate and is not to be crossed when streaming the main content and the navigation interface concomitantly, the encoding-bit-rate threshold value being chosen among the plurality of time variable encoding bit rates independently of the available bandwidth of the telecommunication network;
receive the command to display the navigation interface;
define an image quality chosen among said plurality of image qualities, said image quality being chosen such that the encoding bit rate-used for the streaming of the main content remains higher than said defined threshold value; and
transmit a request to access the secondary content of the interface, the request including a datum representative of the defined image quality; and
receiving both main content with a bit rate higher than said threshold value and the secondary content with the defined image quality.

7. The entity according to claim 6, wherein the entity is comprised in the reader terminal.

8. A non-transitory computer-readable data medium on which at least one sequence of program-code instructions has been stored, which when executed by a processor of a multimedia-stream reader terminal configure the multimedia-stream reader terminal to manage streaming of a televisual content, called a main content, and of a navigation interface concomitantly from a telecommunication network, the navigation interface comprising regions including contents representative of real-time televisual contents available for selection, which are called secondary contents, the main content being streamed in the form of chunks having a plurality of time-variable encoding bit rates including a lower bit rate and a higher bit rate, an encoding bit rate for the main content being selected as a function of an available bandwidth of the telecommunication network, wherein to a secondary content of the secondary contents available for selection has a plurality of image qualities, and wherein the managing comprises:
prior to receiving a command to display the navigation interface, defining an encoding-bit-rate threshold value, which is higher than the lower bit rate and is not to be crossed when streaming the main content and the navigation interface concomitantly, the encoding-bit-rate threshold value being chosen among the plurality of time variable encoding bit rates independently of the available bandwidth of telecommunication network;
receiving the command to display the navigation interface; and
defining an image quality chosen among said plurality of image qualities, said image quality being chosen such that the encoding bit rate-used for the streaming of the main content remains higher than said defined threshold value;
transmitting a request to access the secondary content of the interface, the request including a datum representative of the defined image quality; and
receiving both main content with a bit rate higher than said threshold value and the secondary content with the defined image quality.

* * * * *